Patented Sept. 28, 1926.

1,601,301

UNITED STATES PATENT OFFICE.

JOHN R. DUNCAN AND EDWIN L. LANGDON, OF CHICAGO, ILLINOIS.

MATERIAL FOR PERMANENTLY SEALING ROOT CANALS OF TEETH.

No Drawing.    Application filed January 28, 1924. Serial No. 689,163.

Heretofore, when the pulp in a tooth has been exposed by decay or accident it has been customary completely to remove the same from the pulp chamber and root canals and, in the case of undeveloped six-year molars, these have usually been extracted for the reason that they could no longer develop normally after the removal of the pulp. The principal purpose of the present invention or discovery is to make it possible to permit healthy pulp, if there be such, to remain in the root canals of teeth which it has heretofore been deemed necessary to extract or from which it has been the custom to remove the entire pulp.

We have solved the problem by the discovery of compound or mixture that may be placed in contact with live pulp without injury to the latter, has the capacity to heal and preserve, is a disinfectant and antiseptic, and is capable of forming a permanent seal between the root canals and the pulp chamber of a tooth.

Therefore, while our discovery permits the successful sealing of all or even a portion of the pulp in a root canal, it is further useful in the treatment and preservation of any teeth that are in a devitalized condition, that are putrescent or abscessed, or that are anæsthetized.

Viewed in one of its aspects, our discovery may therefore be said to have for its object or purpose the production of a novel compound or material for sealing root canals of teeth and at the same time placing the teeth in a healthy condition and preserving them.

The preferred formula for our improved material is as follows: ammoniated alum, 48 parts; aristol, (dithymol iodide) 4 parts; magnesium oxide, 96 parts; thymol, 36 parts; zinc oxide, 168 parts; and sufficient cresol and formalin, in equal proportions, to give the desired consistency to the mixture. The proportions given are by weight. All of the ingredients may of course be mixed together, ready for use; but in order to prevent gradual evaporation upon exposure from time to time of a considerable quantity of the material as small portions are separated therefrom for use, we prefer to mix together the first five ingredients, which are in dry form, and to make a separate mixture of the cresol and formalin. The dentist is thus able to mix together such quantities of powder and liquid as he may need from time to time. Also, he may use the liquid and the powder separately under certain conditions.

During a long period of experimentation our preferred formula has invariably given successful results, but it may be that there may be substituted for some of the ingredients others possessing similar properties and we shall therefore describe the properties and purpose of the several ingredients of our formula as we understand them. The ammoniated alum is an astringent, causing contraction of local blood vessels and capillaries, decreasing secretion, and has great curative properties in traumatic conditions. Aristol, in combination with the alum, has great healing properties and reduces inflammation. Iodoform might be used as a substitute for aristol but it has a disagreeable odor and produces discoloration, and it is also apt to cause poisoning by absorption. Magnesium oxide is an antidote for any effect that the arsenic, used in the preparatory steps of the treatment of a tooth, might leave, and it also serves to show the location of the sealing material under X-ray. Bismuth subnitrate has practically the same properties as magnesium oxide in this respect. Thymol is an irritant, an antiseptic, a disinfectant, and has fine healing properties. Zinc oxide is used as a base and has slight healing properties. Formalin is a powerful penetrating agent and acts also as a germicide. The cresol dilutes the formalin and, combined with the latter, acts chemically on the gases evolved in the decomposition of organic matter.

In the treatment of a tooth in which the pulp has been or must be exposed, only that portion of the pulp contained in the pulp chamber is removed or, if a portion of the pulp in a root canal is diseased, that portion must also be removed, leaving only the healthy remainder in the tooth. The pulp chamber must be thoroughly cleaned and dried and then be filled with our improved material in the form of a paste. A seal of temporary stopping is then applied, slight pressure being used, and is finished by means of a hot instrument. A cement base sufficiently strong to withstand the pressure of mastication is then added. An undeveloped six-year molar, for example, thus treated will grow to normal size.

In the treatment of putrescent or abscessed teeth more work is required. After such a tooth has been opened, if the diseased condition has not extended beyond the root end, a dressing of the liquid component of our improved material is sealed in with temporary cement and allowed to remain for two days. The dressing is then removed and all tissue removed from the canal. A second dressing of this kind may be required but, if not, the canal is filled with our improved material in the form of a paste, the powder and the liquid elements being mixed together. After four or five days the canal may be cleaned and again filled with the paste. In a week or ten days the canal is again cleaned and then refilled with new paste which then remains permanently in the tooth. If abscessed teeth show decided areas at the apices, they must be drained and be allowed to remain open for from twenty-four to thirty-six hours, after which the steps just described may be followed.

In the case of a tooth in which the pulp is alive and a post crown is decided upon, the pulp is removed by either the pressure or the arsenic method and the canal is thoroughly cleaned. The canal is then filled with a paste composed of the powder constituent of our improved material, mixed with beechwood creosote and formalin. After a day or a day and a half the canal is cleaned and dried with hot air. The canal is then refilled with the same kind of paste as before, this paste remaining permanently in the tooth.

While we have described with particularity only a single preferred formula with slight modification and have set forth only a few rules for the use thereof under several conditions commonly encountered by dentists, we do not desire to be limited to the exact formula given or to the specific modes of use stated, but intend to cover a field commensurate with our invention or discovery as set forth in the definitions of our invention constituting the appended claims.

We claim:

1. A material comprising a dry mixture of ammoniated alum, aristol, magnesium oxide, thymol, and zinc oxide, which is adapted to be mixed with an antiseptic solution to form a paste for the sealing of root canals of teeth.

2. A material comprising a mixture of ammoniated alum, aristol, magnesium oxide, thymol, and zinc oxide, all in dry powdered form which is adapted to be mixed with an antiseptic solution to form a paste for the sealing of root canals of teeth.

3. A material comprising a mixture of forty-eight parts of ammoniated alum, four parts of aristol, ninety-six parts of magnesium oxide, thirty-six parts of thymol and one hundred and sixty-eight parts of zinc oxide, which is adapted to be mixed with an antiseptic solution to form a paste for sealing the root canals of teeth.

4. A material comprising a mixture of ammoniated alum, aristol, a substance not permeable to X-rays, thymol, and a substance to give body to the mixture, all in dry powdered form, which is adapted to be mixed with an antiseptic solution to form a paste for the sealing of root canals of teeth.

5. A paste for sealing root canals of teeth comprising ammoniated alum, aristol, magnesium oxide, thymol and zinc oxide, mixed with cresol and formalin.

In testimony whereof, we sign this specification.

JOHN R. DUNCAN.
EDWIN L. LANGDON.